US009121429B2

(12) United States Patent
Hartman et al.

(10) Patent No.: US 9,121,429 B2
(45) Date of Patent: Sep. 1, 2015

(54) THREADED FASTENER POSITIVE ANTI-ROTATION LOCKING DEVICE (71) Applicant: HONEYWELL INTERNATIONAL INC., Morristown, NJ (US)

(72) Inventors: Timm E. Hartman, Phoenix, AZ (US); Casey Hanlon, Queen Creek, AZ (US); Mitchell Laidlaw, Tempe, AZ (US); Kellan Geck, Chandler, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 331 days.

(21) Appl. No.: 13/856,875

(22) Filed: Apr. 4, 2013

(65) Prior Publication Data
US 2014/0302960 A1 Oct. 9, 2014

(51) Int. Cl.
F16B 39/02 (2006.01)
F16H 48/42 (2012.01)

(52) U.S. Cl.
CPC ............... F16B 39/02 (2013.01); F16H 48/42 (2013.01)

(58) Field of Classification Search
CPC . F16H 48/42; F16H 57/0018; F16H 57/0025; F16H 57/023; F16B 39/02; F16B 39/10; F16B 39/101; F16B 39/108
See application file for complete search history.

(56) References Cited

U.S. PATENT DOCUMENTS

| 913,486 | A | 2/1909 | Ferguson |
| 1,020,668 | A | 3/1912 | Thompson |
| 1,139,897 | A | 5/1915 | Myers |
| 1,176,621 | A | 3/1916 | Thomshaw |
| 1,201,078 | A | 10/1916 | Ness |
| 1,212,033 | A | 1/1917 | Ensign et al. |
| 1,234,081 | A | 7/1917 | Petersen |
| 1,287,270 | A | 12/1918 | Ensign |
| 2,084,985 | A | 6/1937 | Bill |
| 2,282,360 | A | 5/1942 | Horrocks |
| 2,426,219 | A | 8/1947 | Jackson |
| 3,397,726 | A | 8/1968 | Gohs |
| 3,449,926 | A | 6/1969 | Hawkins |
| 3,600,735 | A | 8/1971 | Jerabek |
| 3,971,614 | A | 7/1976 | Paoli et al. |
| 4,090,545 | A | 5/1978 | Ritter, Jr. |
| 4,286,807 | A | 9/1981 | Bachli |
| 5,664,447 | A | 9/1997 | Neeley |
| 5,713,708 | A | 2/1998 | Van derDrift et al. |
| 6,050,609 | A | 4/2000 | Boscaljon et al. |
| 7,704,029 | B2 | 4/2010 | Blais et al. |
| 7,811,038 | B2 | 10/2010 | Jimenez |
| 7,927,052 | B1 | 4/2011 | Varden |
| 7,984,932 | B2 | 7/2011 | McGuire |
| 8,092,132 | B2 | 1/2012 | Zink et al. |
| 2005/0100424 | A1* | 5/2005 | DiStasio et al. ............ 411/329 |

(Continued)

Primary Examiner — Jacob S Scott
(74) Attorney, Agent, or Firm — Ingrassia Fisher & Lorenz, P.C.

(57) ABSTRACT

An apparatus includes a shaft, a device, a fastener, and an anti-rotation clip. The shaft is configured for rotation. The device is mounted on, and surrounds at least a portion of, the shaft, and has first and second protrusions that are formed on one side and are spaced apart to define a tab space. The fastener is rotationally mounted relative to the shaft, and includes a tab slot formed in its outer surface that extends radially inwardly and is disposed radially inwardly of the tab space. The anti-rotation clip includes a main body portion and a head portion that has a first tab portion and a second tab portion. At least a portion the main body portion is disposed between the device and the fastener, the first tab is disposed in the tab space, and the second tab is disposed in the tab slot.

20 Claims, 4 Drawing Sheets (56) References Cited

U.S. PATENT DOCUMENTS

| | | |
|---|---|---|
| 2009/0116930 A1* | 5/2009 | Reimler ................. 411/337 |
| 2011/0194911 A1 | 8/2011 | Leroyer |
| 2011/0278837 A1 | 11/2011 | Yamamoto et al. |
| 2011/0305538 A1 | 12/2011 | Savoy et al. |
| 2012/0027508 A1 | 2/2012 | Juh et al. |
| 2012/0186390 A1* | 7/2012 | Cook et al. ................. 74/640 |
| 2012/0301245 A1 | 11/2012 | Demland |

* cited by examiner

THREADED FASTENER POSITIVE ANTI-ROTATION LOCKING DEVICE

STATEMENT REGARDING FEDERALLY SPONSORED RESEARCH OR DEVELOPMENT

This invention was made with Government support under Contract Number NAS15-10000 awarded by NASA. The Government has certain rights in this invention.

TECHNICAL FIELD

The present invention generally relates to threaded fastener anti-rotation devices, and more particularly relates to a positive locking anti-rotation device for a threaded fastener.

BACKGROUND

There are many mechanisms that include one or more shaft-mounted devices. The shaft-mounted devices are, in many instances, secured on the shaft via a threaded nut, such as a spanner nut. That is, the threaded nut is threaded onto mating threads that are formed on the shaft, and engages, either directly or indirectly, the shaft-mounted device. The threaded nut may be torqued to a predetermined torque, whereby frictional forces between the shaft and the threaded nut provide a passive locking means to prevent rotation of the threaded nut.

In some instances, it may be desirable to provide a secondary (e.g., back-up), positive anti-rotation locking device for the threaded nut. However, the space envelope provided for such devices can be limited, thereby limiting the possible choices for implementing such devices. Moreover, some known anti-rotation locking devices, such as T-locks, that may potentially fit within such limited space envelopes, undesirably rely on deformation to provide the anti-rotation locking feature.

Hence, there is a need for a positive locking anti-rotation device that can be used in relatively small space envelopes, and that do not rely on deformation to provide the anti-rotation locking feature. The present invention addresses at least these needs.

BRIEF SUMMARY

In one embodiment, an apparatus includes a shaft, a device, a fastener, and an anti-rotation clip. The shaft is configured for rotation. The device is mounted on, and surrounds at least a portion of, the shaft, and has a first side, a second side, a first protrusion, and a second protrusion. The first and second protrusions are formed on the first side of the device and are spaced apart to define a tab space between the first and second protrusions. The fastener is rotationally mounted relative to the shaft via a threaded coupling, and includes an inner surface, an outer surface, a first side, and a second side. The inner surface surrounds a portion of the shaft, and the outer surface has a tab slot formed therein that extends radially inwardly. At least a portion of the fastener second side engages at least a portion of the first side of the device, and the tab slot is disposed radially inwardly of the tab space. The anti-rotation clip includes a main body portion and a head portion. The main body portion has a first end and a second end. The head portion is coupled to the second end of the main body portion and has a first tab portion and a second tab portion. The first tab portion extends radially outwardly, and the second tab portion extends radially inwardly. At least a portion the main body portion is disposed between the device and the fastener, the first tab is disposed in the tab space, and the second tab is disposed in the tab slot.

In another embodiment, a mechanism includes a shaft, a device, a plurality of arcuate protrusions, a fastener, a plurality of tabs, and an anti-rotation clip. The device is mounted on, and surrounds at least a portion of, the shaft. The device has a first side and a second side. The arcuate protrusions are formed on and extend from the first side of the device. Each arcuate protrusion includes a first end, a second end, an inner surface, and an outer surface. The inner surface of each arcuate protrusion is spaced apart from the first side of the device to form a first annular groove between the inner surface and the first side of the device. The arcuate protrusions are spaced apart to form a tab space between the first end of one arcuate protrusion and the second end of another arcuate protrusion. The fastener is rotationally mounted relative to the shaft via a threaded coupling and includes an inner surface, an outer surface, a first end, and a second end. The inner surface has second threads formed thereon that mate with the first threads. A portion of the outer surface is surrounded by the device. The tabs are formed on and extend radially outward from the outer surface of the fastener. Each tab includes a first side, a second side, an inner side, an outer side, and an arcuate engagement portion extending axially from the inner side. The tabs are spaced apart to form a tab slot between the first side of one tab and the second side of another tab. Each arcuate engagement portion engages the first side of the device and defines a second annular groove between the inner side and the first side of the device. The tab slot is disposed radially inward of the tab space and between the first end of one arcuate protrusion and the second end of another arcuate protrusion to define, together with the tab space, an anti-rotation space. The anti-rotation clip includes a main body portion and a head portion. The main body portion has a first end and a second end. The head portion is coupled to the second end of the main body and has a first tab portion and a second tab portion. The first tab portion extends radially outwardly, and the second tab portion extends radially inwardly. The main body portion is disposed in an annular space defined by a first annular groove and a second annular groove that are aligned with each other, and the head portion is disposed in the anti-rotation space.

In yet another embodiment, a differential summing gear assembly includes a gear housing, a shaft, a differential input gear, a spanner nut, and an anti-rotation clip. The shaft is rotationally mounted in the gear housing. The differential input gear is mounted on, and surrounds at least a portion of, the shaft. The differential input gear has a first side, a second side, a first protrusion, and a second protrusion. The first and second protrusions are formed on the differential input gear first side and are spaced apart to define a tab space between the first and second protrusions. The spanner nut is rotationally mounted relative to the shaft via a threaded coupling, and includes an inner surface, an outer surface, a first side, and a second side. The inner surface surrounds a portion of the shaft, and the outer surface has a tab slot formed therein that extends radially inwardly. At least a portion of the spanner nut second side engages at least a portion of the differential input gear first side, and the tab slot is disposed radially inwardly of the tab space. The anti-rotation clip includes a main body portion and a head portion. The main body portion has a first end and a second end. The head portion is coupled to the second end of the main body portion and has a first tab portion and a second tab portion. The first tab portion extends radially outwardly, and the second tab portion extends radially inwardly. At least a portion the main body portion is disposed between the differential input gear and the spanner nut. The first tab is disposed in the tab space, and the second tab is disposed in the tab slot.

Furthermore, other desirable features and characteristics of the positive anti-rotation locking device will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

With the above in mind, it will be appreciated that although the anti-rotation locking device is described as being implemented with a differential summing gear, the anti-rotation locking device may be implemented with numerous other mechanisms that include a shaft-mounted nut for which positive anti-rotation locking is needed or desired.

Figure 1:
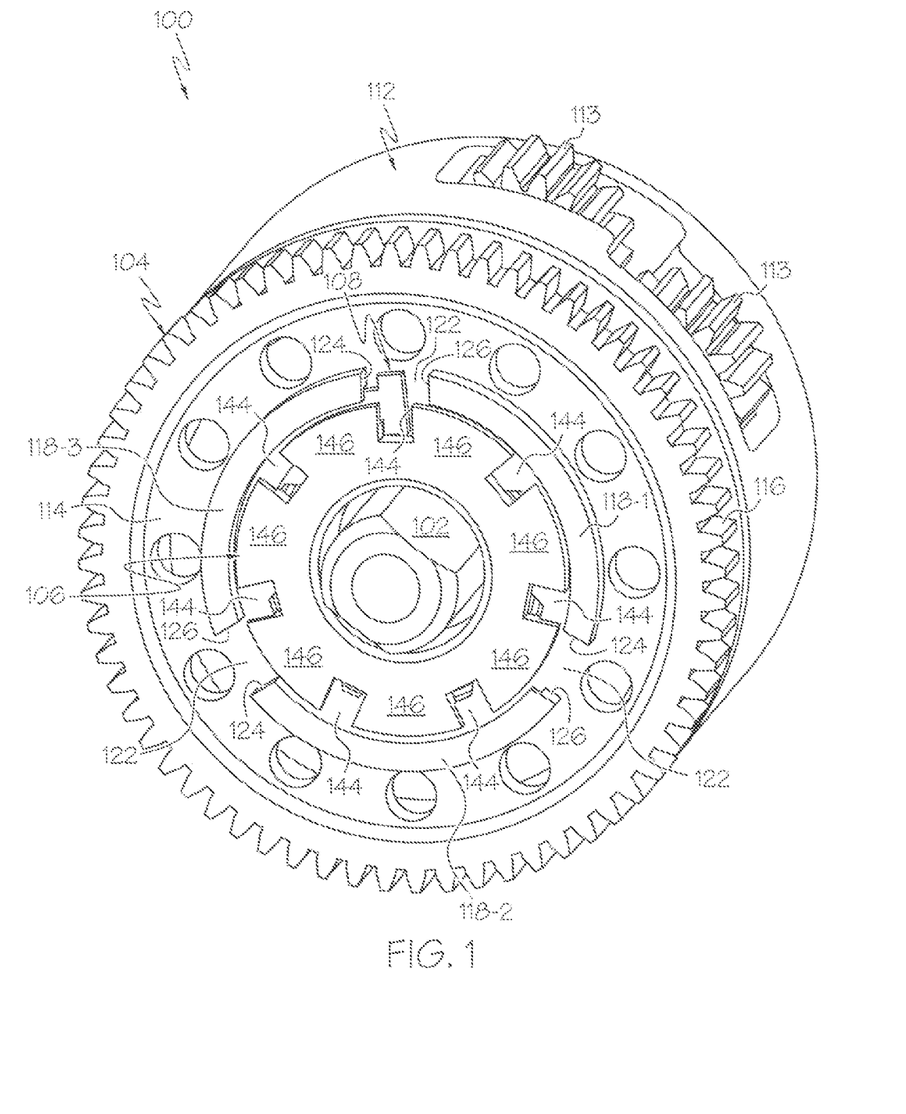
FIG. 1 depicts a perspective view of one embodiment of a mechanism.
Figure 2:
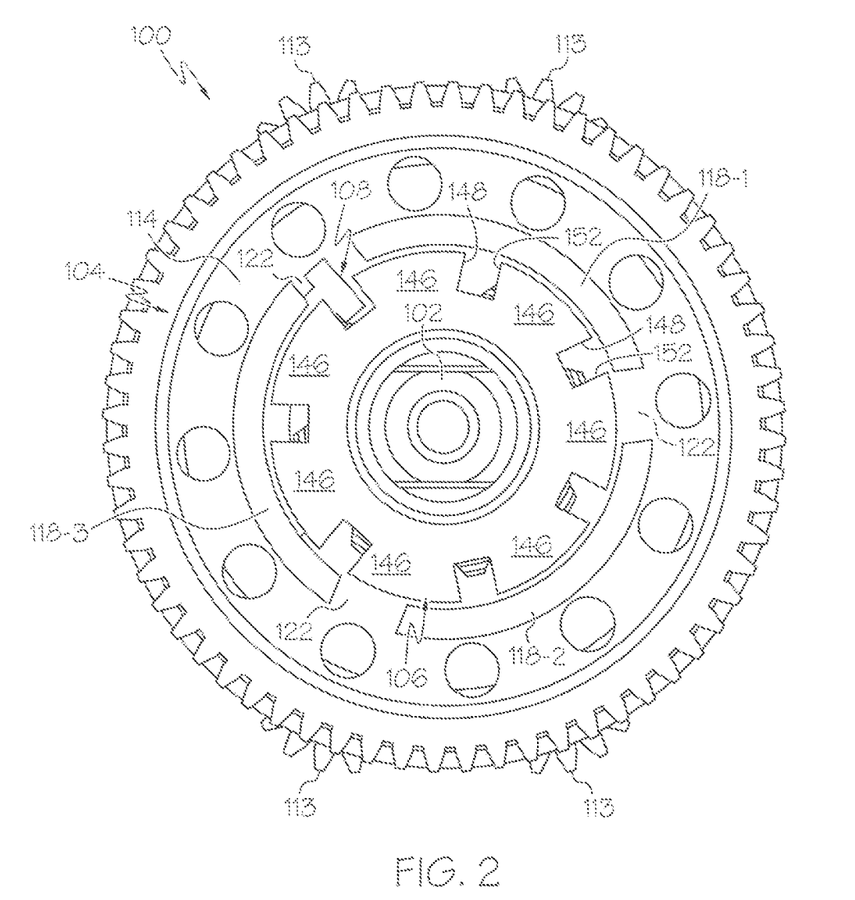
FIG. 2 depicts a front end view of the mechanism of FIG. 1.
Figure 3:
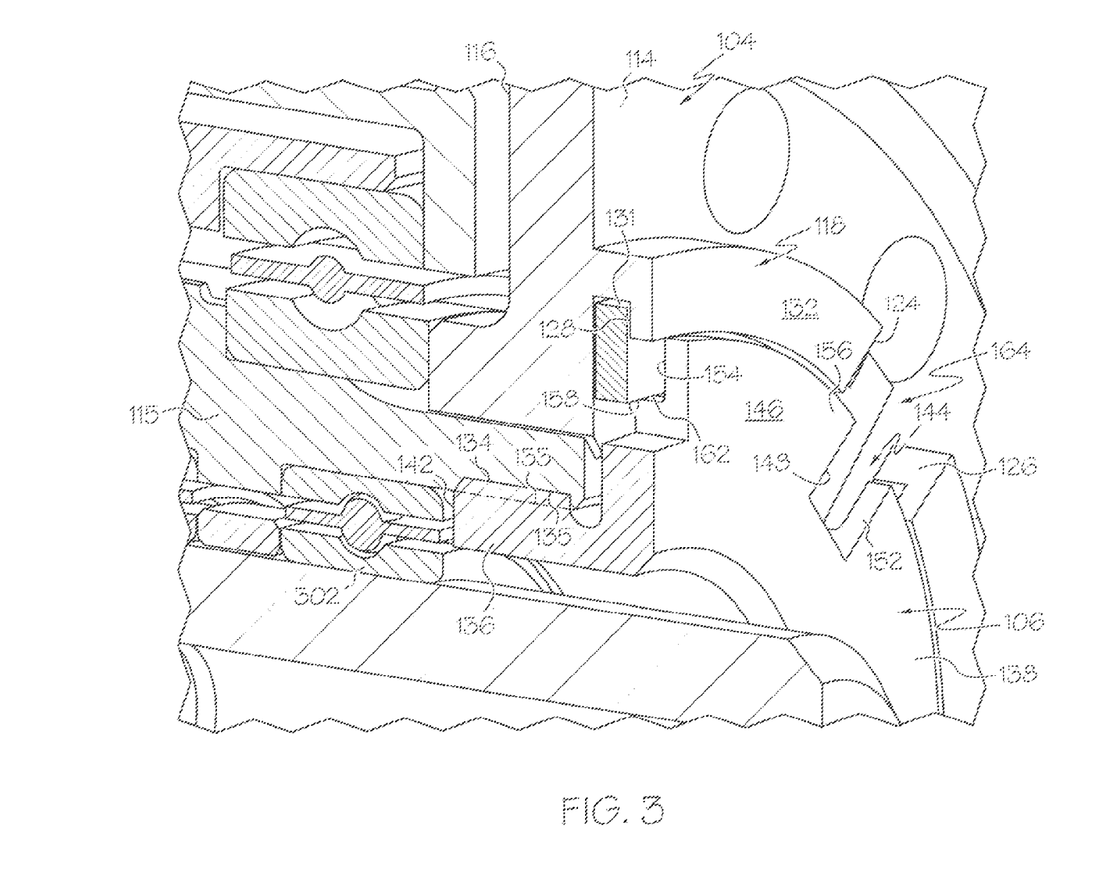
FIG. 3 depicts a partial cut-away view of a portion of the mechanism of FIGS. 1 and 2.

Referring now to FIGS. 1-3, various views of an embodiment of a mechanism 100 are depicted. The depicted mechanism 100 includes a shaft 102 that is configured for rotation, a device 104 mounted on the shaft 102, a fastener 106 threaded onto the shaft 102, and an anti-rotation clip 108. In the depicted embodiment, the mechanism 100 is configured as a differential speed summing gear assembly, in which the device 104 is a differential input gear, and the fastener 106 is a spanner nut. In addition to the differential input gear 104 and the spanner nut 106, the depicted mechanism 100 additionally includes a gear housing 112, a plurality of planet gears 113, and one or more sun gears 115 (one partially visible in FIG. 3).

The shaft 102 is configured for rotation, and thus, as FIG. 3 depicts, is rotationally mounted within the gear housing 112 via one or more bearing assemblies 302. With continued reference to FIG. 3, it is seen that the differential input gear 104 is rotationally mounted on, and surrounds at least a portion of, the shaft 102. More specifically, at least in the depicted embodiment, the differential input gear 104 is mounted on the sun gear 115, which is rotationally mounted on the shaft 102 via the depicted bearing assembly 302. Thus, when a torque is applied to the differential input gear 104 to cause it to rotate, it will in turn cause the sun gear 115 to rotate. The sun gear 115 is meshed with the planet gears 113, which are rotationally mounted within the gear housing 112. Thus, when the sun gear rotates 115, the planet gears 113 also rotate.

Referring once again to FIGS. 1 and 2, the differential input gear 104 has a first side 114, a second side 116 (depicted more clearly in FIG. 3), and a plurality of protrusions 118. In the depicted embodiment, the differential input gear 104 includes three protrusions 118-1, 118-2, 118-2. In other embodiments, however, the differential input gear 104 could include more or less than this number of protrusions 118. No matter the specific number of protrusions 118, each is formed on the first side 114 of the differential input gear 104, and are spaced apart to define a tab space 122 between each protrusion 118. The protrusions 118 may be variously shaped and configured, but in the depicted embodiment each is arcuate shaped and includes a first end 124 and a second end 126. As FIG. 3 depicts, each protrusion 118 additionally includes an inner surface 128 and an outer surface 132. The inner surface 128 of each protrusion 118 is spaced apart from the first side 114 of the differential input gear 104 to form a first annular groove 131.

The fastener 106 is coupled to the shaft 102 via a threaded coupling. In the depicted embodiment, the fastener 106 is configured as a spanner nut, and a portion of its outer surface 134 has threads 133 formed thereon that mate with like threads 135 formed on another shaft-mounted device. This shaft-mounted device could be, for example, the above-mentioned sun gear 115. The fastener 106 additionally includes an inner surface 136, a first side 138, and a second side 142. The inner surface 136 surrounds a portion of the shaft 102. The outer surface 134, in addition to having the threads 135 formed thereon, has at least one a tab slot 144 formed therein that extends radially inwardly. The particular number of the tab slots 144 may vary. In the depicted embodiment, the fastener 106 includes seven tab slots 144, though the fastener could be implemented with more or less than seven. The configuration of the fastener 106 and of each tab slot 144 may also vary. One particular configuration will now be described.

The outer surface 134 of the depicted fastener 106 has a plurality of tabs 146 formed thereon that extend radially outward. Each tab 146, as shown more clearly in FIG. 3, includes a first side 148, a second side 152, an inner side 154, an outer side 156, and an arcuate engagement portion 158 that extends axially from the inner side 154. The tabs 146 are spaced apart to form a tab slot 144 between the first side 148 of one tab 146 and the second side 152 of another tab 146. Each arcuate engagement portion 158 engages the first side 114 of the differential input gear 104, and defines a second annular groove 162 between the inner side 154 of the associated tab 146 and the first side 114 of the differential input gear 104. When the fastener 106 is properly torqued onto the shaft-mounted device 115, at least one tab slot 144 is disposed radially inward of one of the tab spaces 122 and between the first end 124 of one protrusion 118 and the second end 126 of another protrusion 118. Together, the aligned tab slot 144 and tab space 122 define what is referred to herein as an anti-rotation space 164.

The anti-rotation clip 108 is partially disposed between the differential input gear 104 and the fastener 106. As shown more clearly in FIG. 2, the anti-rotation clip 108 includes a main body portion 166 and a head portion 168. The main body portion 166 has a first end 172 and a second end 174, and is the portion of the anti-rotation clip 108 that is disposed between the differential input gear 104 and the fastener 106. The head portion 168 is coupled to the second end 174 of the main body portion 166 and has a first tab portion 176 that extends radially outwardly, and a second tab portion 178 that extends radially inwardly. When the anti-rotation clip 108 is properly installed, the head portion 166 is disposed in the anti-rotation space 164. More specifically, the first tab portion 176 is disposed in the tab space 122, and the second tab portion 178 is disposed in the tab slot 144.

Figure 4:
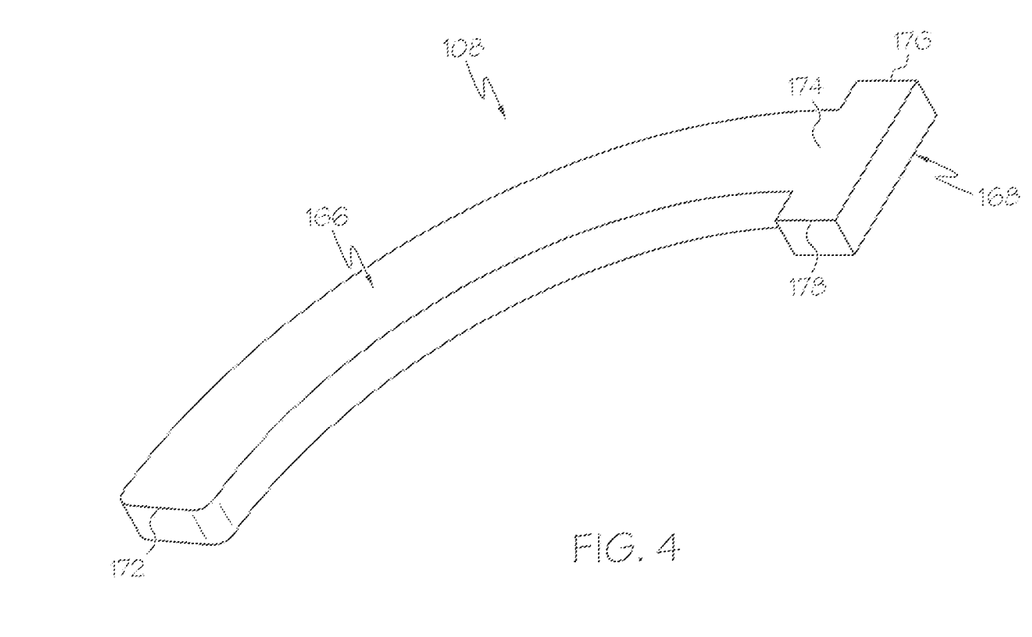
FIG. 4 depicts a plan view of a positive anti-rotation locking device that may be used with the mechanism depicted in FIGS. 1-3.

The anti-rotation clip 108 may be variously shaped, and may be fabricated of various materials. One particular embodiment of the anti-rotation clip 108 is depicted in FIG. 4, and it is seen that at least the main body portion 166 is arcuate shaped. This is so that, when it is installed, it fits within the first and second annular grooves 131, 162, which are also arcuate in shape. The depicted anti-rotation clip 108 is fabricated from 17-7 corrosion resistant spring steel, though various other materials could also be used.

With the depicted mechanism 100, after the differential input gear 104 (and the various other depicted components) is mounted on the shaft 102, the fastener 106 is tightened to an appropriate preload torque, so that at least one of the tab spaces 122 and one of the tab slots 144 are aligned. Thereafter, the anti-rotation clip 108 is put in place. That is, the main body portion 166 is inserted into one of the sets of first and second annular grooves 131, 162. Upon full insertion of the main body portion 166, the head portion 168 snaps into the defined anti-rotation space 164. In the unlikely event that the fastener 106 were to lose its preload and start to loosen, the first and second tab portions 176, 178 will engage one of the ends of the protrusions 118 that define the tab space 122 and one of the sides of the tabs 146 that define the tab slot 144. This engagement provides a positive locking function, which prevents any further loosening of the fastener 106.

It is again noted that the anti-rotation clip 108 disclosed herein is not limited to use with the depicted differential summing gear, nor any other summing gear for that matter. Rather, the anti-rotation clip 108 may be used whenever a positive locking mechanism is needed to prevent loosening of a threaded fastener relative to another device, so long as the fastener and device have the appropriate spaces, slots, and engagement surfaces.

It is once again emphasized that although the apparatus 100 is depicted and described herein as being implemented as a differential input gear, the apparatus may be implemented as any one of numerous apparatus that may have a shaft-mounted gear or pulley or any other shaft-mounted device that needs to be anti-rotated. It is additionally noted that the shaft-mounted device 104 may be used to either transfer torque from the shaft 106 or transfer torque to the shaft 106. Furthermore, it will be appreciated that the device 104 may be mounted on the shaft 102 via a splined interface, a woodruff key, a "D" cross section, a "double D" cross section, or any one of numerous other means where a rotational clearance may exist that will tend to try and loosen the fastener 106 retaining the device 104 to the shaft 102.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus, comprising:
   a shaft configured for rotation;
   a device mounted on, and surrounding at least a portion of, the shaft, the device having a first side, a second side, a first protrusion, and a second protrusion, the first and second protrusions formed on the first side of the device and spaced apart to define a tab space between the first and second protrusions;
   a fastener rotationally mounted relative to the shaft via a threaded coupling, the fastener including an inner surface, an outer surface, a first side, and a second side, the inner surface surrounding a portion of the shaft, the outer surface having a tab slot formed therein that extends radially inwardly, at least a portion of the fastener second side engaging at least a portion of the first side of the device, the tab slot disposed radially inwardly of the tab space; and
   an anti-rotation clip including a main body portion and a head portion, the main body portion having a first end and a second end, the head portion coupled to the second end of the main body portion and having a first tab portion and a second tab portion, the first tab portion extending radially outwardly, the second tab portion extending radially inwardly, at least a portion of the main body portion disposed between the device and the fastener, the first tab disposed in the tab space, the second tab disposed in the tab slot.

2. The apparatus of claim 1, wherein the first and second protrusions are each configured as arcuate protrusions that are formed on and extend from the first side of the device.

3. The apparatus of claim 2, wherein:
   each arcuate protrusion comprises a first end, a second end, an inner surface, and an outer surface;
   the inner surface is spaced apart from the first side of the device to form an annular groove between the inner surface and the first side of the device; and
   the tab space is between the first end of one arcuate protrusion and the second end of another arcuate protrusion.

4. The apparatus of claim 1, wherein the fastener comprises:
   a plurality of tabs formed on and extending radially outward from the fastener outer surface, each tab including a first side, a second side, an inner side, an outer side, the tabs spaced apart to form the slot between the first side of one tab and the second side of another tab.

5. The apparatus of claim 4, wherein the fastener further comprises:
an arcuate engagement portion extending axially from the inner side of each tab, each arcuate engagement portion engaging the first side of the device and defining an annular groove between the tab inner side and the first side of the device.

6. The apparatus of claim 1, wherein the main body portion of the anti-rotation clip has an arcuate shape.

7. The apparatus of claim 1, wherein the fastener is configured as a nut.

8. The apparatus of claim 7, wherein the nut is configured as a spanner nut.

9. A mechanism, comprising:
a shaft;
a device mounted on, and surrounding at least a portion of, the shaft, the device having a first side and a second side;
a plurality of arcuate protrusions formed on and extending from the first side of the device, each arcuate protrusion including a first end, a second end, an inner surface, and an outer surface, the inner surface of each arcuate protrusion spaced apart from the first side of the device to form a first annular groove between the inner surface and the first side of the device, the arcuate protrusions spaced apart to form a tab space between the first end of one arcuate protrusion and the second end of another arcuate protrusion;
a fastener rotationally mounted relative to the shaft via a threaded coupling and including an inner surface, an outer surface, a first end, and a second end, the inner surface having second threads formed thereon that mate with the first threads, a portion of the outer surface surrounded by the device;
a plurality of tabs formed on and extending radially outward from the outer surface of the fastener, each tab including a first side, a second side, an inner side, an outer side, and an arcuate engagement portion extending axially from the inner side, the tabs spaced apart to form a tab slot between the first side of one tab and the second side of another tab, each arcuate engagement portion engaging the first side of the device and defining a second annular groove between the inner side and the first side of the device, the tab slot disposed radially inward of the tab space and between the first end of one arcuate protrusion and the second end of another arcuate protrusion to define, together with the tab space, an anti-rotation space; and
an anti-rotation clip including a main body portion and a head portion, the main body portion having a first end and a second end, the head portion coupled to the second end of the main body and having a first tab portion and a second tab portion, the first tab portion extending radially outwardly, the second tab portion extending radially inwardly, the main body portion disposed in an annular space defined by a first annular groove and a second annular groove that are aligned with each other, the head portion disposed in the anti-rotation space.

10. The mechanism of claim 9, wherein the fastener further comprises:
an arcuate engagement portion extending axially from the inner side of each tab, each arcuate engagement portion engaging the first side of the device and defining an annular groove between the tab inner side and the first side of the device.

11. The mechanism of claim 9, wherein the main body portion of the anti-rotation clip has an arcuate shape.

12. The mechanism of claim 9, wherein the fastener is configured as a nut.

13. The mechanism of claim 11, wherein the nut is configured as a spanner nut.

14. A differential summing gear assembly, comprising:
a gear housing;
a shaft rotationally mounted in the gear housing;
a differential input gear mounted on, and surrounding at least a portion of, the shaft, the differential input gear having a first side, a second side, a first protrusion, and a second protrusion, the first and second protrusions formed on the differential input gear first side and spaced apart to define a tab space between the first and second protrusions;
a spanner nut rotationally mounted relative to the shaft via a threaded coupling, the spanner nut including an inner surface, an outer surface, a first side, and a second side, the inner surface surrounding a portion of the shaft, the outer surface having a tab slot formed therein that extends radially inwardly, at least a portion of the spanner nut second side engaging at least a portion of the differential input gear first side, the tab slot disposed radially inwardly of the tab space; and
an anti-rotation clip including a main body portion and a head portion, the main body portion having a first end and a second end, the head portion coupled to the second end of the main body portion and having a first tab portion and a second tab portion, the first tab portion extending radially outwardly, the second tab portion extending radially inwardly, at least a portion of the main body portion disposed between the differential input gear and the spanner nut, the first tab disposed in the tab space, the second tab disposed in the tab slot.

15. The assembly of claim 14, wherein the first and second protrusions are each configured as arcuate protrusions that are formed on and extend from the first side of the device.

16. The assembly of claim 15, wherein:
each arcuate protrusion comprises a first end, a second end, an inner surface, and an outer surface;
the inner surface is spaced apart from the first side of the differential input gear to form an annular groove between the inner surface and the first side of the differential input gear; and
the tab space is between the first end of one arcuate protrusion and the second end of another arcuate protrusion.

17. The assembly of claim 14, wherein the nut comprises:
a plurality of tabs formed on and extending radially outward from the nut outer surface, each tab including a first side, a second side, an inner side, an outer side, the tabs spaced apart to form the tab slot between the first side of one tab and the second side of another tab.

18. The assembly of claim 17, wherein the nut further comprises:
an arcuate engagement portion extending axially from the inner side of each tab, each arcuate engagement portion engaging the first side of the differential input gear and defining an annular groove between the tab inner side and the first side of the differential input gear.

19. The assembly of claim 14, wherein the main body portion of the anti-rotation clip has an arcuate shape.

20. The assembly of claim 14, further comprising:
a sun gear rotationally mounted on the shaft and coupled to the differential input gear; and a plurality of planet gears rotationally mounted within the gear housing, each planet gear meshed with the sun gear.

* * * * *